United States Patent
Regaard

(10) Patent No.: US 7,989,730 B2
(45) Date of Patent: Aug. 2, 2011

(54) METHOD AND DEVICE FOR DETERMINING THE LATERAL RELATIVE DISPLACEMENT BETWEEN A PROCESSING HEAD AND A WORKPIECE

(75) Inventor: Boris Regaard, Ypsilanti, MI (US)

(73) Assignees: Fraunhofer-Gesellschaft zur Förderung der angewandten Forschung e.V., Munich (DE); Rheinisch-Westfälische Technische Hochschule Aachen, Aachen (DE)

( * ) Notice: Subject to any disclaimer, the term of this patent is extended or adjusted under 35 U.S.C. 154(b) by 519 days.

(21) Appl. No.: 11/920,121

(22) PCT Filed: May 4, 2006

(86) PCT No.: PCT/DE2006/000775
§ 371 (c)(1),
(2), (4) Date: Nov. 27, 2007

(87) PCT Pub. No.: WO2006/119734
PCT Pub. Date: Nov. 16, 2006

(65) Prior Publication Data
US 2008/0246973 A1    Oct. 9, 2008

(30) Foreign Application Priority Data
May 12, 2005 (DE) .......................... 10 2005 022 095

(51) Int. Cl.
*B23K 26/00* (2006.01)
*B23K 26/03* (2006.01)
(52) U.S. Cl. .......... 219/121.83; 219/121.63; 219/121.67
(58) Field of Classification Search .............. 356/71–73, 356/64–640; 219/121.83, 121.62–121.64, 219/121.67
See application file for complete search history.

(56) References Cited

U.S. PATENT DOCUMENTS

| | | | | |
|---|---|---|---|---|
| 4,891,767 A |   | 1/1990 | Rzasa et al. | |
| 5,168,141 A | * | 12/1992 | Tashjian et al. | 219/121.63 |
| 5,373,135 A | * | 12/1994 | Beyer et al. | 219/121.67 |
| 5,486,677 A | * | 1/1996 | Maischner et al. | 219/121.83 |
| 5,681,490 A | * | 10/1997 | Chang | 219/121.64 |
| 5,698,120 A | * | 12/1997 | Kurosawa et al. | 219/121.62 |
| 5,841,097 A | * | 11/1998 | Esaka et al. | 219/121.63 |
| 5,869,805 A | * | 2/1999 | Beyer et al. | 219/121.83 |
| 5,893,959 A | * | 4/1999 | Muellich | 156/272.8 |

(Continued)

FOREIGN PATENT DOCUMENTS

DE      101 26 725 A1    12/2002

*Primary Examiner* — Sang Nguyen
(74) *Attorney, Agent, or Firm* — Breiner & Breiner, L.L.C.

(57) ABSTRACT

The present invention relates to a method for determining a lateral relative movement between a processing head and a workpiece during processing the workpiece as well as a device to carry it out. In the method a surface of the workpiece (12) is illuminated in the region of the processing head with an optical radiation (2). The optical radiation (3) reflected from the surface of the workpiece (12) in the region of the processing head is repeatedly detected in a locally resolved manner by an optical detector (9), which is firmly fixed mechanically to the processing head, to obtain optical reflection patterns. The repeated detection occurs in temporal intervals in which the temporally successive reflection patterns of overlapping surface regions of the workpiece (12) are obtained. The lateral relative movement is determined by comparing the temporally successive reflection patterns. The method and the corresponding device permit contactless measurement of the relative movement between the processing head and the workpiece with great precision.

19 Claims, 4 Drawing Sheets

U.S. PATENT DOCUMENTS

| | | |
|---|---|---|
| 5,961,858 A | 10/1999 | Britnell |
| 6,249,591 B1 | 6/2001 | Tullis |
| 6,757,055 B1 * | 6/2004 | Kluft .............................. 356/73 |
| 6,791,057 B1 * | 9/2004 | Kratzsch et al. .......... 219/121.63 |
| 2009/0032512 A1 * | 2/2009 | Regaard et al. .......... 219/121.83 |

* cited by examiner

METHOD AND DEVICE FOR DETERMINING THE LATERAL RELATIVE DISPLACEMENT BETWEEN A PROCESSING HEAD AND A WORKPIECE

TECHNICAL BACKGROUND

The present invention relates to a method for determining a lateral relative movement between a processing head and a workpiece during processing of the workpiece, in particular using a processing beam. The invention also relates to a device for processing a workpiece using a processing beam. The device comprises the processing head and is designed to determine the lateral relative movement between the processing head and a workpiece.

In processing workpieces with a processing beam, in particular a laser beam, usually either the workpiece is moved under the processing head from which the processing beam emerges or the processing head is led over the workpiece. An example is laser material processing in which the laser beam is guided, for example for welding, cutting, soldering or depositing or generating over the surface of the workpiece. In such processing procedures, the relative movement between the processing beam and the workpiece has to be carried out with precision and control in accordance with the selected processing strategy. Similar requirements apply for other processing methods in which, for example, a mechanical workpiece is employed in the processing head.

STATE OF THE ART

In industrially used equipment for processing workpieces, the relative movement can, if need be, be obtained from the control data of the handling system moving the processing head or the workpiece. However, sufficiently precise positioning is necessary to obtain sufficiently exact data. As an alternative, tactile measuring means are known which determine the current velocity from the revolving velocity of a pressing roll firmly fixed mechanically to the processing head and pressing on the workpiece during processing.

DE 10126725 describes a method and a device for laser processing in which in addition to the processing laser, a positioning laser is employed to control the processing procedure. A sensor detects the laser light of the positioning laser reflected from the workpiece in order to be able to conclude from the position and the intensity of the light spot on the sensor the distance of the processing head from the workpiece.

The object of the present invention is to provide a method for determining the lateral relative movement between a processing head and a workpiece during processing the workpiece, which permits contactless, precise detection of the relative movement. Moreover, a device for processing a workpiece with a processing beam which permits carrying out the method will be described.

DESCRIPTION OF THE INVENTION

The object is solved with the method and device according to the claims. Advantageous embodiments of the method and the device are the subject matter of the subordinate claims or can be drawn from the following description and the preferred embodiments.

In the present method for determining a lateral relative movement between a processing head and a workpiece, a surface of the workpiece in the area of the processing head is illuminated with an optical radiation. This illumination can occur continuously or repetitively only upon detection of a reflection pattern as described in the following. The optical radiation reflected from the surface of the workpiece in the area of the processing head is repeatedly detected in a locally resolved manner by an optical detector which is fixed mechanically firmly or rigidly to the processing head. Optical reflection patterns are obtained at different times with the optical detector. The repeated detection occurs at intervals in which temporally successive reflection patterns of overlapping areas of the workpiece are obtained. In this manner the respective reflection pattern covers thereby a spatial area of the workpiece surface of a certain dimension determined by the optical imaging system of the optical detector and the distance from the workpiece surface. If a relative movement occurs between the processing head and the workpiece, the reflection patterns caused by the different surface areas of the workpiece at different intervals are detected. The intervals at which the reflection patterns are detected must be selected so small that the temporally successive detected reflection patterns are from surface areas of the workpiece which overlap in such a manner that some segments of the reflection patterns coincide. The lateral relative movement can then be determined by comparing the temporally successive reflection patterns in that a shift of the identical or very similar segments in the temporally successive reflection patterns is determined and the lateral relative movement between the processing head and the workpiece is determined from the shift while taking into account the imaging geometry. This determination can occur continuously during, before or after processing or only as needed. In this case, the lateral relative movement refers to the movement between the workpiece and the processing head parallel to the workpiece surface or perpendicular to the radiation axis of a processing beam that may be used for processing. This movement usually occurs in a straight line in one direction. However, for example, a rotation movement between the workpiece and the processing head may also be considered in determination.

This method also permits detection of different relative movements of different areas of the workpiece, for example if to-be-joined workpieces shift, in that the relative movements are detected in several segments of the image, respectively of the reflection pattern.

This method utilizes the fact that in material processing workpieces usually have rough surfaces. This surface roughness generates an irregular reflection pattern when illuminated, in particular if the illumination is perpendicular to the surface or slightly inclined. In most applications, the required roughness is automatically given. Each illuminated surface area of the workpiece generates a characteristic irregular reflection pattern which can be detected by a perferably perpendicular or slightly inclined disposed locally resolving detector, for example a CMOS camera. The relative movement between the processing head and the workpiece can be determined by comparing two successive takes, respectively reflection patterns, in that very similar details can be found in these takes. The relative movement of these areas or relative shift corresponds to the pixel shift in these areas taking into account the optical imaging for recording the reflection pattern. Preferably, the cross-correlation method is used to determine the most similar segments.

The present method is preferably employed in processing a workpiece with a processing beam emerging from the processing head, the workpiece being illuminated with optical radiation preferably at least approximately coaxially to the processing beam, for example an ion, electron or laser beam, in the area where the processing beam impinges on the workpiece. The method can be carried out in an especially advantageous manner if illumination of the surface of the workpiece with the optical radiation and detection of the optical radiation reflected from the surface of the workpiece occur through the device for guiding and/or shaping the processing beam.

A particularly advantageous application of the method and the corresponding device is laser material processing. Any type of laser radiation source, for example $CO_2$ lasers, Nd:YAG lasers or diode lasers, can be used as radiation sources for the processing beam. The method is especially suited for all processing procedures in which the optical system for guiding the processing beam permits illuminating and observing the processing zone parallel to the processing beam. One example is laser material processing with $CO_2$ lasers in which the processing zone, can be illuminated and observed, for example through a borehole in the focusing mirror for the laser radiation. Another example is laser material processing with Nd:YAG lasers in which the illumination and observation can occur, for example, through a dichroic mirror in the processing optic.

The optical radiation for illumination of the workpiece is preferably selected in such a manner that the secondary radiation generated by the processing and the back-scattered processing radiation of the processing procedure can be at least partially suppressed compared to the reflected optical illumination radiation by an optical filter. The optical filter is placed before the optical detector in such a manner that the reflection pattern is not influenced or only minimally influenced by this interference radiation, which too is incident. The intensity of the optical radiation for illumination of the workpiece must also be selected sufficiently high in order to suprairradiate the interference radiation impinging on the detector. Preferably the wavelength of the optical radiation for illuminating the workpiece is selected in a different range than the wavelength of the processing beam. Used as the light source for the illumination may be, for example, a diode laser. By using an optical band pass filter of the same wavelength as the optical radiation, the interference radiation lying outside this wavelength range is supressed. In this manner measurement can also occur during the processing procedure as the interfering secondary radiation and the interfering back-scattered processing radiation of the processing beam is sufficiently faded out.

The device for processing a workpiece with a processing beam developed for carrying out the method comprises a processing head provided with at least one coupling-in aperture and a beam-shaping optic for the processing beam and a locally resolving optical detector. In an advantageous embodiment, a coupling-in aperture for an illumination beam and an illumination optic are also provided, which is placed in the processing head in such a manner that it directs the illumination beam coupled in via the coupling-in aperture at least approximately coaxially to the beam axis of the processing beam on the processing plane. The beam-shaping optic is placed in such a manner that it directs the processing beam along the beam axis through an exit aperture at a processing plane lying before the processing head. The optical detector is designed to detect in a locally resolved manner the optical beam back-scattered from the processing plane parallel to or at a small angle to the beam axis and is correspondingly attached to the processing head. The optical detector is connected to an evaluation unit which, using an image-processing algorithm, automatically evaluates the detected reflection patterns to determine the relative movement between the processing head and the workpiece.

The present method and the corresponding device permit contactless measurement, respectively determination, of a lateral relative movement between the processing head and the workpiece during processing the workpiece. Precision of the method is independent of the control data of the handling system guiding the workpiece or the processing head. Standardization of the respective measurement interval for detecting the reflection patterns also permits calculating the average relative velocity during the measurement interval. This relative velocity between the processing head and the workpiece, which corresponds to the processing velocity, is used, for example, to control the power of the processing beam during processing with a processing beam, which can occur for the purpose of maintaining the applied energy on a stretch constant during processing the workpiece.

Furthermore, measurement of the relative movement can also be used for quality-control monitoring of the process. The optical system for illumination and detection can also be employed as a detection system for quality-control monitoring with other state-of-the-art methods, thus obviating the need of additional components.

Combining the sensor formed by the illumination optic and the optical detector with a forward-viewing sensor by an optical filter to detect the seam position (seam tracking sensor), for example a light section sensor, permits determining seam deviation from the current processing position when closing a seam in the workpiece, thus permits online correction of the processing position, i.e. followup regulation. In this case determination of the current position from the control of the handling device or robot is not necessary.

A special advantage of the present method and of the corresponding device is that with at least approximately coaxial illumination and observation of the processing zone there is no shading or distortion of the processing zone. The relative movement can thus be reliably detected at any time during processing. The automatic image processing permits monitoring the processing procedure in real time which can also be utilized to control or regulate the process.

Any light source which has sufficiently high intensity compared to the intensity of the secondary radiation, respectively of the back-scattered processing radiation, or which has wavelengths that can be separated from the interference radiation by an optical filter to a degree sufficient for detection can be employed as the illumination source. Preferably a laser can be used as the illumination source, for example a diode laser.

BRIEF DESCRIPTION OF THE DRAWINGS

The present method and the corresponding device are made more apparent in the following using preferred embodiments with reference to the accompanying drawings without the intention of limiting the scope of the protection set forth in the claims.

WAYS TO CARRY OUT THE INVENTION

Figure 3:
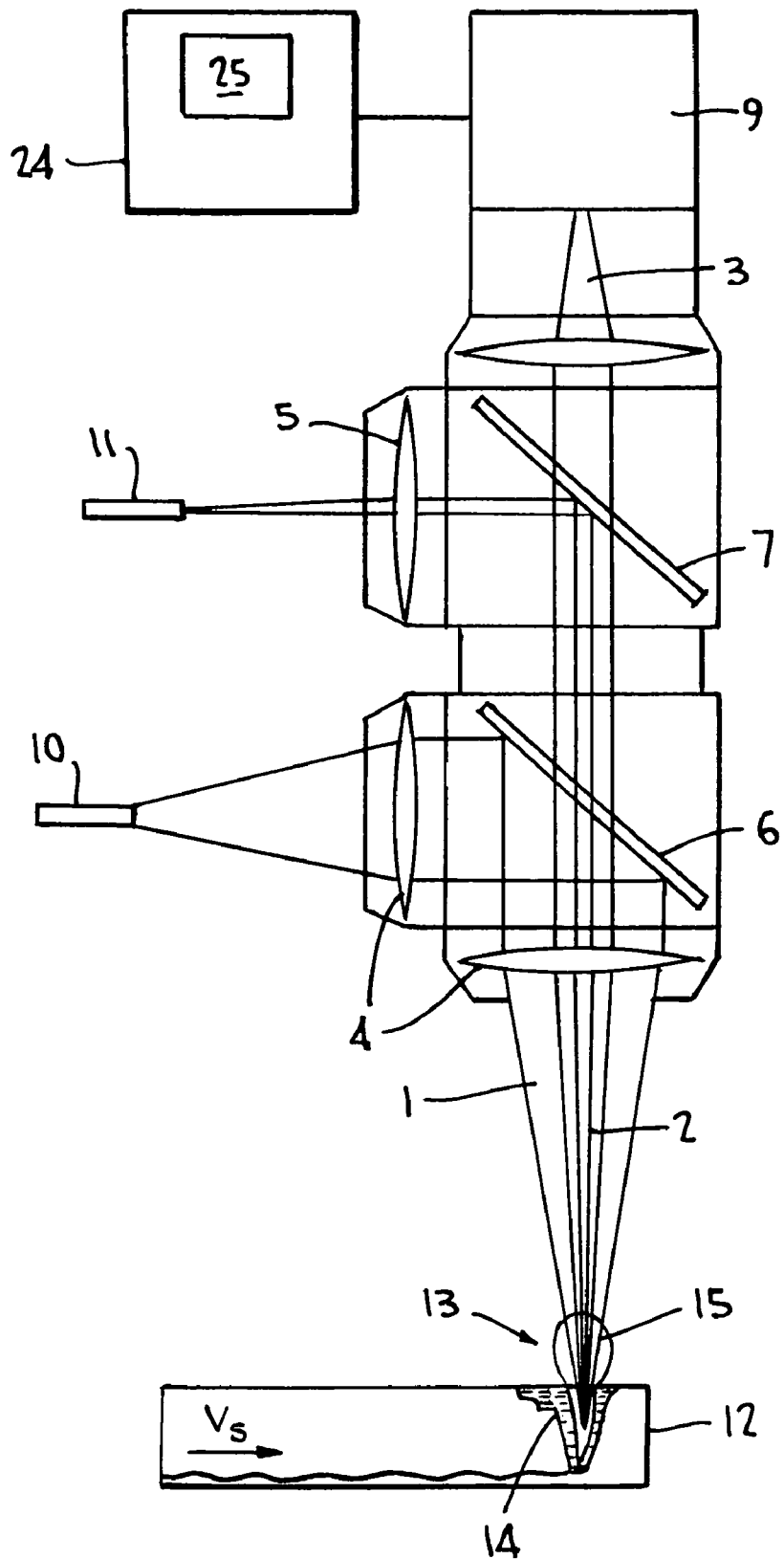
FIG. 3 shows a first example of a processing head according to the present invention.

The present method is described once more using the device in FIG. 3 depicting processing a workpiece 12 with laser beam 1 as the processing beam. FIG. 3 shows the processing head of an embodiment of the present device with the beam-shaping optic, respectively the focusing optic 4 and the dichroic deflection mirror 6 with which the laser beam 1 coupled in via a fiber 10 is directed at the surface of the workpiece 12. During processing, the workpiece 12 is moved under the laser beam 1 with a velocity of $v_s$ to obtain the desired processing results. Furthermore the present device has a coupling-in aperture for the illumination beam 2, in the present case a laser beam of a laser diode. The illumination beam 2 is applied via a beam-splitter plate 7 through the dichroic deflection mirror 6 to illuminate the processing zone 13. Naturally, the wavelength of the illumination beam 2 must be selected in such a manner that the illumination can occur through the dichroic mirror 6. Beam shaping occurs via an illumination optic 5 in conjunction with the workpiece-facing part of the focusing optic 4 employed for laser-beam shaping.

The optical beam parts 3 back-scattered from the workpiece surface take the same path back through the beam-splitter plate 7 to the CMOS camera 9 which records a locally resolved image of the radiation back scattered from the processing zone 13. In this example as in the examples of FIGS. 4-6, the CMOS camera 9 is connected to an evaluation unit 24 which determines the relative movement from the recorded reflection patterns by means of comparison. The evaluation unit 24 includes an image processor 25.

In processing the workpiece 12 with the laser beam 1, the material is conveyed locally into a gaseous phase 15 and locally partially melted by the high intensity of the laser beam 1 at the point of impact as the melted area 14 in FIG. 3 shows. During this processing, the coaxial illumination and recording of the parts of the beam 3 of this illumination scattered back from the processing zone yields a reflection pattern of the workpiece surface at the currently processed area. The relative velocity can be determined by repeatedly recording such a reflection pattern during the relative movement between the workpiece 12 and the processing head.

Figures 1, 2:
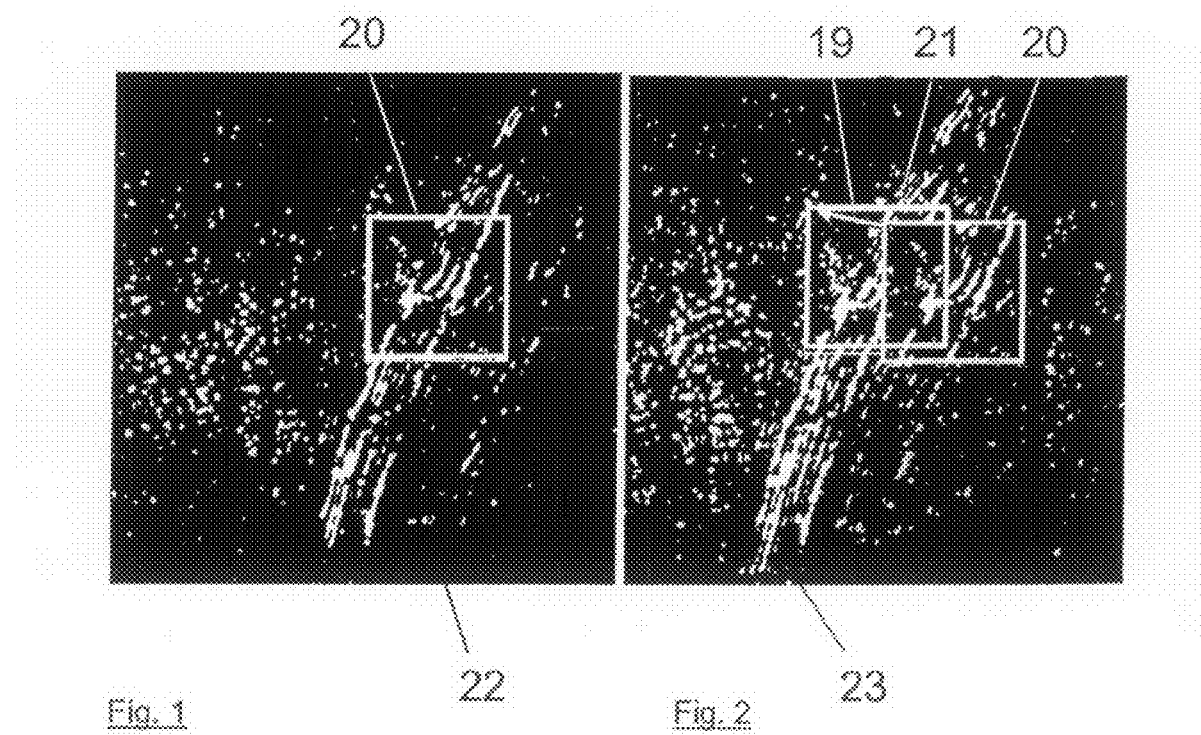
FIGS. 1/2 show an example of two successively recorded reflection patterns of the surface of a workpiece.

FIGS. 1 and 2 show two images 22, 23, respectively reflection patterns, of the workpiece surface recorded successively in short intervals by camera 9. For better clarity, the two images show the irregularities of the workpiece surface, which however are not required for carrying out the process. For evaluation, image details with the greatest similarity are sought in the two successive images 22, 23. To do this, the search section 20 of the first image 22 following image 23 is shifted pixel by pixel into the search section of the following image 23 in both coordinate axes (cf. image 23 of FIG. 2). Similarity is determined for each position. Frame 21 marks the detail of greatest similarity. The relative movement between the workpiece and the processing head can be determined from a shift of the detail of greatest similarity in both images while taking into account optical imaging, i.e. enlargement or miniaturization of the workpiece, as shown in FIG. 2, in which the image detail of the first image 22 of figure is superimposed on image 23 at the original position. The arrow indicates a shift 19 determined by comparing the two images.

This comparison is conducted for all succeeding takes, respectively reflection patterns. The temporal interval for recording these reflection patterns has to be selected sufficiently small in order to still be able recognize identical segments in the successive images. In this manner the relative movement between the processing head and the workpiece can be monitored during the entire processing. However, this determination can, of course, only occur at certain times, when at least two successive takes are taken.

A measure of the similarity of image areas (cross-correlation coefficient) can, for example be obtained by computing the sum of all the pixels of the image difference of this image area, in this definition the value 0 corresponds to maximum similarity:

with:

$$\sum_{x=x_{min}}^{x_{max}} \sum_{y=y_{min}}^{y_{max}} |I_1(x, y) - I_2(x, y)|$$

$I_1(x,y)$=measured value of pixels at position (x,y) of the image 1; $I_2(x,y)$=the measured value of pixels at the position (x,y) of image 2;

Increased measurement resolution can be achieved by running a pixel estimate, a familiar method in measurement technology. A prerequisite is the validity of the correlation polynomial, usually in the form of a paraboloid, in the vicinity of maximum similarity. Then a shift in subpixel precision corresponds to the maximum correlation polynomial, with the maximum similarity and the surrounding measurement points serving as points of support.

Figure 4:
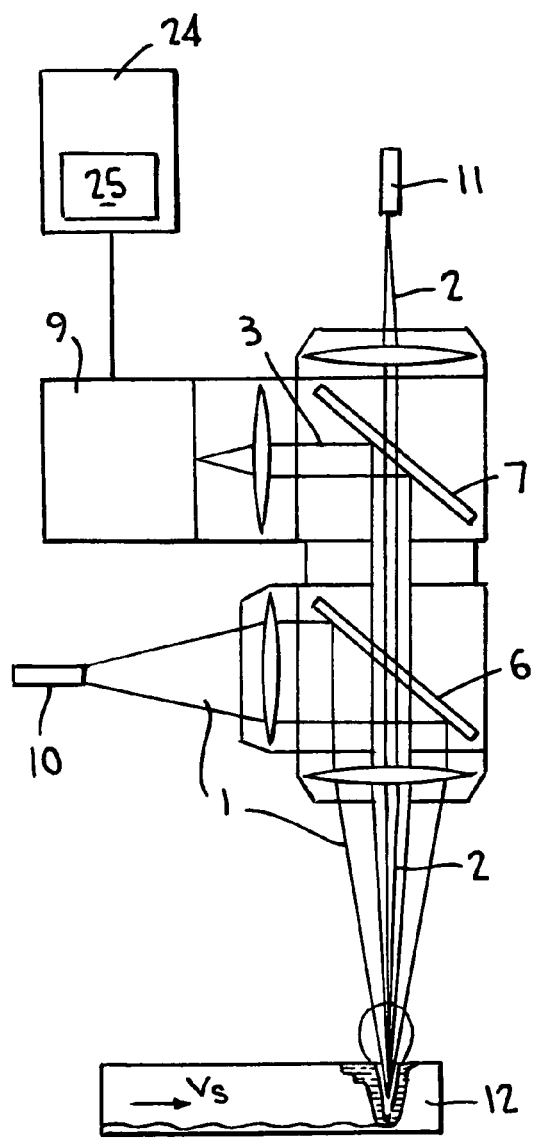
FIG. 4 shows a second example of a processing head according to the present invention.

FIG. 4 shows another example of an embodiment of the present device in which the placement of fiber 11 of the illumination beam 2 and the CMOS camera 9 for detection of the back-scattered optical radiation 3 is reversed. Apart from this the same description applies as in FIG. 3.

Figure 5:
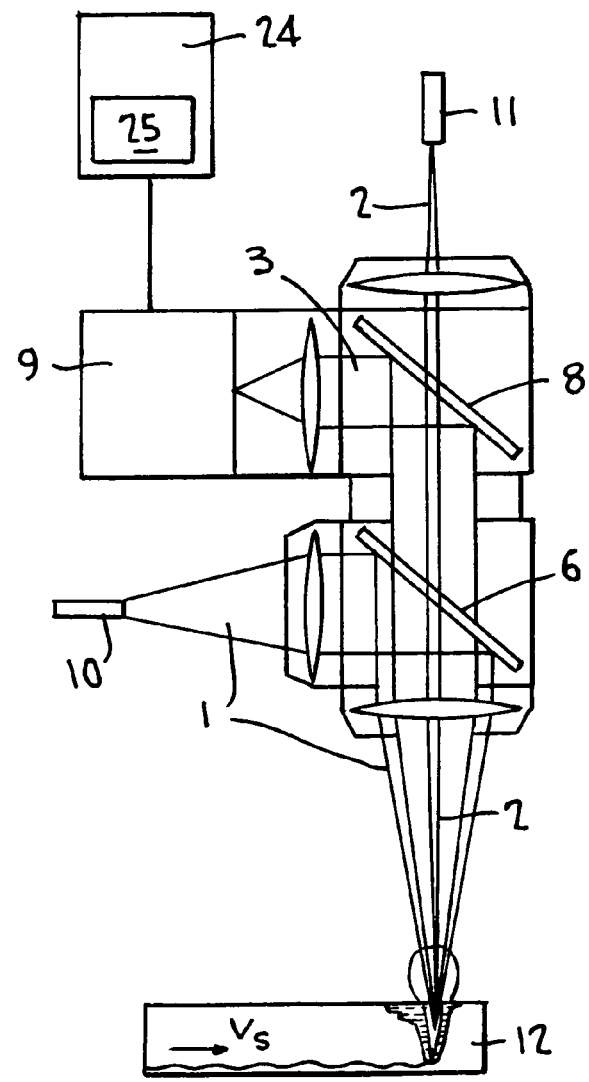
FIG. 5 shows a third example of a processing head according to the present invention.

FIG. 5 shows an example of an embodiment of the present device in which, unlike in the embodiment of FIG. 4, the illumination beam 2 is directed at the processing zone 13 through an aperture in a scraper mirror 8. The scraper mirror 8 directs the radiation parts 3 scattered back from the processing zone 13 at the CMOS camera 9.

Figure 6:
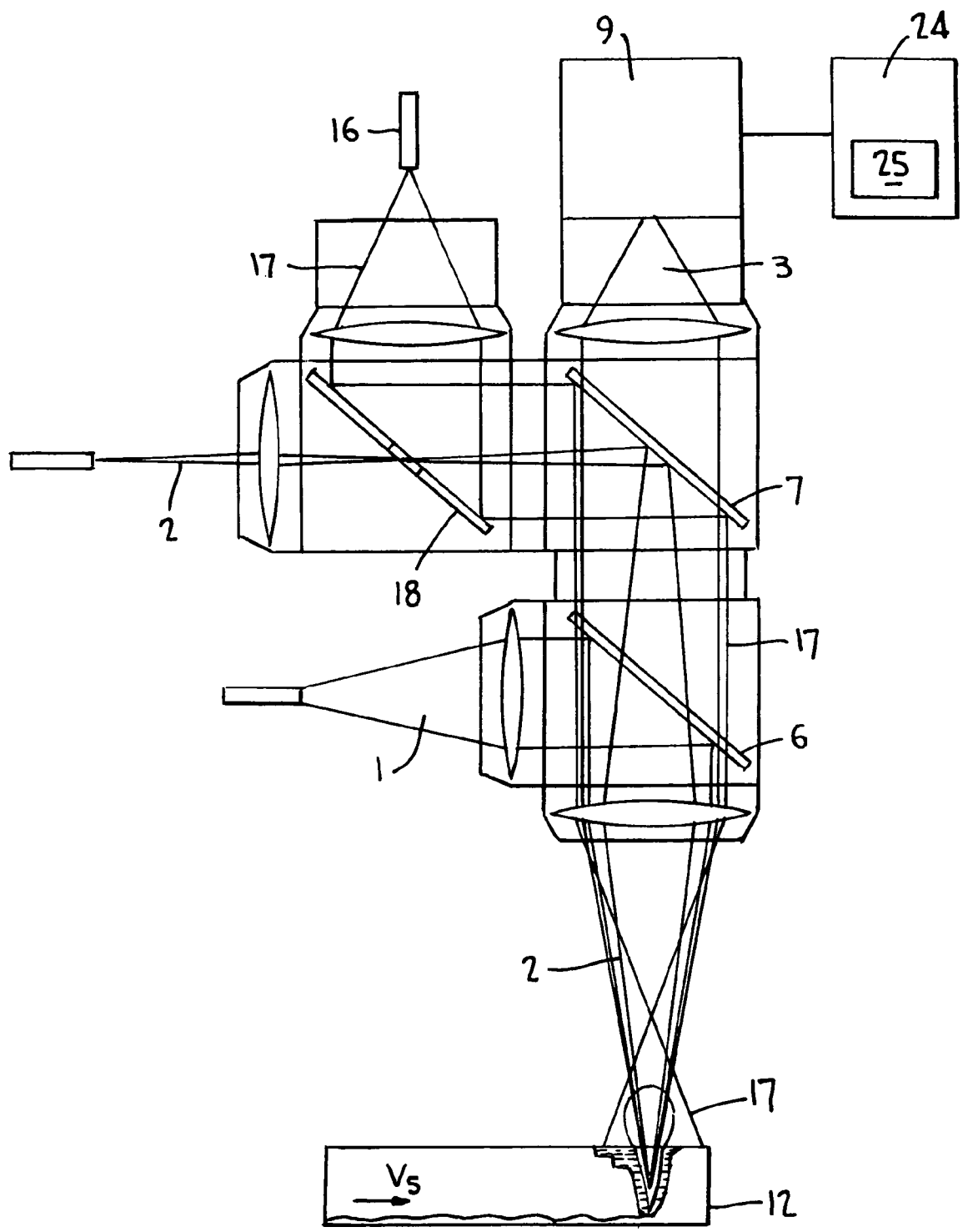
FIG. 6 shows a fourth example of a processing head according to the present invention.

Finally, FIG. 6 shows a further development of the present device in which, in addition to detecting the relative movement, seam deviation from the current processing position is determined. This is advantageous, for example, in welding a seam with the processing beam as a to-be-monitored processing procedure. In this case, the device is also provided with an additional light source 16, by means of which a ring-shaped illumination beam is directed at the workpiece coaxially to the processing beam. The illumination beam 2 and the additional ring-shaped illumination beam 17 are directed at the workpiece on the same axis via the scraper mirror 18 and via the partially reflecting mirror 7, as shown in FIG. 6. The linear illumination pattern created on the workpiece surface by this ring-shaped illumination beam is also recorded by CMOS camera 9 and evaluated in order to detect the position of the seam on the surface of the workpiece. Thus, in addition to the sensor for measuring relative movement, this device also has a seam tracking sensor, both of which are integrated in the processing head. Employed in both measuring methods is the same locally resolving detector, the CMOS camera 9.

The forward-viewing seam tracking sensor, i.e. the sensor for detecting the seam position, determines the seam position via a light section method by detecting the back-scattering of the coaxial ring illumination. Determining seam deviation from the current processing position-permits online correction of the processing position (seam tracking control), with the required current processing position information being computed by integrating the measured velocity.

LIST OF REFERENCES

1 processing laser beam
2 illumination beam 3 back-scattered radiation parts
4 focusing optic
5 illumination optic
6 dichroic mirror
7 beam-splitter plate
8 scraper-mirror
9 CMOS camera
10 fiber of the processing beam
11 fiber of the illumination beam
12 workpiece
13 processing zone
14 melted area
15 gaseous phase
16 light source of the ring-shaped illumination beam
17 ring-shaped illumination beam
18 scraper mirror
19 shift
20 search detail of the first image
21 frame of the detail of greatest similarity
22 first image
23 succeeding image
24 evaluation unit
25 image processor.

What is claimed is:

1. A method for determining a lateral relative movement between a processing head and a workpiece during processing the workpiece, comprising:
   illuminating a surface of the workpiece in a region of the processing head with optical radiation provided by a laser;
   detecting repeatedly in a locally resolved manner optical radiation reflected from the surface of the workpiece in the region of the processing head by an optical detector which is fixed firmly to the processing head to obtain optical reflection patterns of the surface of the workpiece at different times, wherein the detecting occurs in temporal intervals, in which temporally successive reflection patterns of overlapping surface regions of the workpiece are obtained; and
   determining by an evaluation unit the lateral relative movement by comparing the temporally successive reflection patterns.

2. The method according to claim 1, wherein during the processing of the workpiece with a processing beam, the detecting of the optical radiation reflected from the surface of the workpiece occurs at least approximately coaxially to the processing beam.

3. The method according to claim 2, further comprising selecting intensity of the optical radiation for illumination of the surface of the workpiece so that secondary radiation generated processing and back-scattered beam parts of the processing beam are suprairradiated by the reflected optical radiation at the optical detector.

4. The method according to claim 2, further comprising computing a lateral relative velocity from each determined lateral relative movement or from averaging a multiplicity of determined relative movements and utilizing the lateral relative velocity to control power of the processing beam.

5. A method according to claim 1, wherein during the processing of the workpiece with a processing beam, illumination of the surface of the workpiece occurs at least approximately coaxially to the processing beam.

6. The method according to claim 5, wherein the illumination of the surface of the workpiece with the optical radiation and the detecting of the optical radiation reflected from the surface of the workpiece occurs through a unit for guiding and/or shaping the processing beam.

7. The method according to claim 5 or 6, further comprising selecting a wavelength range for the illumination of the surface of the workpiece so that secondary radiation generated during processing and back-scattered beam parts of the processing beam can be at least partially suppressed compared to the optical radiation reflected by an optical filter placed before the optical detector.

8. The method according to claim 1, further comprising computing a lateral relative velocity from each determined lateral relative movement or from averaging a multiplicity of determined relative movements.

9. The method according to claim 1, further comprising determining segments of greatest similarity in the temporally successive reflection patterns and computing relative movement from a shift of these segments.

10. The method according to claim 9, wherein cross correlations between the temporally successive reflection patterns are formed to determine the segments of greatest similarity.

11. The method according to claim 1, further comprising linearly illuminating the surface of the workpiece at a triangulation angle by an optical radiation in a processing direction before a current processing area and an illumination pattern formed on the surface is detected by the optical detector in order to obtain by a light section method a current position of a seam on the surface by evaluation of an illumination pattern.

12. The method according to claim 1, wherein a current position of a seam on the surface is determined by evaluation of the reflection patterns.

13. The method according to claim 11 or 12, wherein a seam deviation from a current processing position is determined from the reflection patterns and the current position of the seam and is utilized to control the lateral relative movement to minimize the seam deviation.

14. A device for processing a workpiece with a processing beam comprising:
   a processing head provided with a coupling-in aperture for the processing beam;
   a beam-shaping optic, with which the processing beam is directed along a beam axis through an exit aperture at a processing plane lying before the processing head;
   an optical detector which is firmly fixed mechanically to the processing head and positioned to detect in a locally resolved manner optical radiation reflected from the processing plane parallel or at a small angle to the beam axis; and
   an evaluation unit connected to the optical detector and including an image processor for evaluating temporally successive reflection patterns to automatically determine a lateral relative movement between the processing head and a workpiece.

15. The device according to claim 14, wherein the processing head has an additional coupling-in aperture for an illumination beam and an illumination optic which directs the illumination beam at least approximately coaxially to the beam axis of the processing beam at the processing plane.

16. The device according to claim 15, wherein provided for the illumination beam or the processing beam is a dichroic mirror serving as a deflection mirror.

17. A device according to claim 15, wherein provided for the illumination beam or the processing beam is a deflection mirror having at least one aperture through which the processing beam or the illumination beam is directed at the processing plane.

18. The device according to one of the claims 15 to 17, wherein the processing head includes an additional coupling-in aperture for an additional illumination beam and the illumination optic is arranged to direct the additional illumination beam at a triangulation angle at the processing plane and the optical detector can detect in a locally resolved manner optical radiation of the additional illumination beam reflected from the processing plane parallel or at an angle to the beam axis.

19. The device according to claim 14, wherein the processing beam is a laser beam.

* * * * *